(12) United States Patent
Suwald

(10) Patent No.: US 9,342,680 B2
(45) Date of Patent: May 17, 2016

(54) SECURITY TOKEN, DATA PROCESSING SYSTEM AND METHOD OF PROCESSING DATA

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 28 days.

(21) Appl. No.: 14/188,056

(22) Filed: Feb. 24, 2014

(65) Prior Publication Data
US 2014/0289845 A1 Sep. 25, 2014

(30) Foreign Application Priority Data
Mar. 19, 2013 (EP) ..................................... 13159912

(51) Int. Cl.
G06F 19/00 (2011.01)
G06F 21/34 (2013.01)
G07C 9/00 (2006.01)
G07F 7/10 (2006.01)
G06F 3/01 (2006.01)
G06Q 20/34 (2012.01)
G07F 7/08 (2006.01)
G07F 7/12 (2006.01)
(Continued)

(52) U.S. Cl.
CPC ................ *G06F 21/34* (2013.01); *B42D 25/22* (2014.10); *G06F 3/016* (2013.01); *G06K 9/00167* (2013.01); *G06K 9/00979* (2013.01); *G06Q 20/34* (2013.01); *G07C 9/00063* (2013.01); *G07F 7/0813* (2013.01); *G07F 7/0853* (2013.01); *G07F 7/1008* (2013.01); *G07F 7/122* (2013.01); *B42D 2033/46* (2013.01)

(58) Field of Classification Search
CPC ........... G06K 9/00167; G06K 9/00979; G06F 3/016; G06F 21/34; G07C 9/00063; G07F 7/1008; G07F 7/0813; G07F 7/0853; G07F 7/122; B42D 25/22; B42D 25/00; B42D 2033/46; G06Q 20/34
USPC ........................................................... 726/20
See application file for complete search history.

(56) References Cited

U.S. PATENT DOCUMENTS 6,325,285 B1 * 12/2001 Baratelli ....................... 235/380
2006/0016871 A1 1/2006 Bonalle et al.
(Continued)

FOREIGN PATENT DOCUMENTS

DE    10 2004 039365 A1    2/2006
EP            1004980 A2    5/2000
(Continued)

OTHER PUBLICATIONS

Extended European Search Report for Application No. 13159912.8 (Aug. 26, 2013).
(Continued)

*Primary Examiner* — Baotran N To

(57) ABSTRACT

According to an aspect of the invention, a security token is conceived, in particular a smart card, comprising a tactile sensing user interface, wherein said tactile sensing user interface is adapted to capture a stream of position data corresponding to a sequence of positions of a finger engaging with said tactile sensing user interface and representing a stream of input data for a data processing device, said security token being adapted to transmit said stream of position data to a host system for further processing.

12 Claims, 9 Drawing Sheets

(51) Int. Cl.
*B42D 25/22* (2014.01)
*G06K 9/00* (2006.01)

(56) References Cited

U.S. PATENT DOCUMENTS

| | | |
|---|---|---|
| 2006/0142063 A1 | 6/2006 | Monsacre |
| 2007/0067642 A1* | 3/2007 | Singhal .................. 713/186 |
| 2008/0148393 A1 | 6/2008 | Wendt |
| 2010/0125362 A1 | 5/2010 | Canora et al. |
| 2011/0165836 A1 | 7/2011 | Dixon et al. |
| 2013/0152185 A1* | 6/2013 | Singh ................ G06F 21/35 726/9 |
| 2014/0173690 A1 | 6/2014 | Ekberg et al. |
| 2014/0270417 A1* | 9/2014 | Lin .............................. 382/124 |

FOREIGN PATENT DOCUMENTS

| | | |
|---|---|---|
| EP | 1424658 A1 | 6/2004 |
| EP | 2575084 A1 | 4/2013 |
| WO | 2005/043451 A2 | 5/2005 |
| WO | 2009/095263 A1 | 8/2009 |

OTHER PUBLICATIONS

Extended European Search Report for Application No. 13159947.4 (Aug. 29, 2013).

* cited by examiner

SECURITY TOKEN, DATA PROCESSING SYSTEM AND METHOD OF PROCESSING DATA

CROSS-REFERENCE TO RELATED APPLICATIONS

This application claims the priority under 35 U.S.C. §119 of European patent application no. 13159912.8, filed on Mar. 19, 2013, the contents of which are incorporated by reference herein.

FIELD OF THE INVENTION

The invention relates to a security token, in particular to a smart card. Furthermore, the invention relates to a data processing system. Furthermore, the invention relates to a method of processing data.

BACKGROUND OF THE INVENTION

In many public and private data processing systems, applications are executed on data processing devices, for example personal computers, laptops, tablets and terminals. In these data processing systems special care has to be taken to accommodate a robust, safe and secure user input interface. The user input interface is typically available through a desktop application programming interface (API) between a physical input device (a keyboard, for example) and processing elements of the data processing device. Secure physical input devices include expensive touch screens and special, protected keyboards. In case of keyboards in public applications, it is difficult to keep the keys clean. Furthermore, in case of explosion endangered environments keyboards may not be allowed. Furthermore, in security relevant environments it is required to protect the user entries against skimming which currently requires high effort and cost.

SUMMARY OF THE INVENTION

It is an object of the invention to facilitate user input in data processing systems, in particular by providing a robust, safe and secure, yet cost-effective, user input interface. This object is achieved by a security token as claimed in claim 1, a data processing system as claimed in claim 7, and a method of processing data as claimed in claim 13.

According to an aspect of the invention, a security token is conceived, in particular a smart card, comprising a tactile sensing user interface, wherein said tactile sensing user interface is adapted to capture a stream of position data corresponding to a sequence of positions of a finger engaging with said tactile sensing user interface and representing a stream of input data for a data processing device, said security token being adapted to transmit said stream of position data to a host system for further processing.

According to an exemplary embodiment, the security token is further adapted to encrypt the stream of position data before transmitting said stream of position data to the host system.

According to a further exemplary embodiment, the security token is further adapted to format the stream of position data as application protocol data units before transmitting said stream of position data to the host system.

According to a further exemplary embodiment, the security token comprises a contact-based interface for transmitting said stream of position data to the host system.

According to a further exemplary embodiment, the security token comprises a contactless interface for transmitting said stream of position data to the host system.

According to a further exemplary embodiment, the security token is further adapted to provide a single-factor or multi-factor user authentication function.

According to a further aspect of the invention, a data processing system is conceived which comprises a security token of the kind set forth and a host system, wherein the host system comprises a data processing device, and wherein the host system is adapted to receive the stream of position data and to convert said stream of position data into the stream of input data for said data processing device.

According to a further exemplary embodiment, the host system comprises a computer program or a secure element for converting said stream of position data into the stream of input data for said data processing device.

According to a further exemplary embodiment, the input data comprise alphanumeric symbols.

According to a further exemplary embodiment, the input data comprise data representing a movement of a pointing device and/or data representing a selection operation performable on a pointing device.

According to a further exemplary embodiment, the input data comprise special keys as defined on a keyboard and/or special character keys as defined on a keyboard.

According to a further exemplary embodiment, the data processing device is one of the group of: a personal computer, a portable computer, a web tablet, a terminal, a mobile device, a vehicle, an industrial process control device.

According to a further aspect of the invention, a method of processing data is conceived, wherein a tactile sensing user interface comprised in a security token, in particular in a smart card, captures a stream of position data corresponding to a sequence of positions of a finger engaging with said tactile sensing user interface and representing a stream of input data for a data processing device, and wherein the security token transmits said stream of position data to a host system for further processing.

BRIEF DESCRIPTION OF THE DRAWINGS

The invention will be described in more detail with reference to the appended drawings, in which.

DESCRIPTION OF EMBODIMENTS

In accordance with the present disclosure, a user interface is conceived that enables control of host applications running on a data processing device (e.g. a PC, mobile device, terminal, web-server) by means of a smart card (contactless, contact-based or dual-interface) comprising a two-dimensional tactile sensor (i.e. a tactile sensing user interface) adapted to locate the position of a finger engaging with said tactile sensor. A stream of position data may be captured by the sensor, translated into machine-readable format and communicated via a standard smart card reader to a host system. A contactless reader and a host system may be combined in a single device, for example in an NFC-enabled mobile device.

Figure 1:
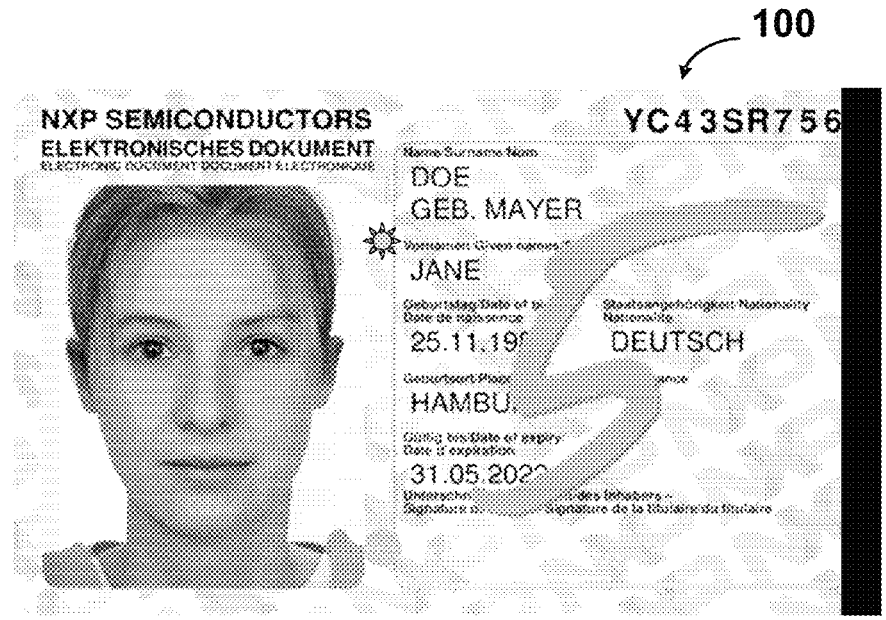
FIG. 1 illustrates an exemplary embodiment of a contactless smart card.

FIG. 1 illustrates an exemplary embodiment of a contactless smart card. In accordance with the present disclosure, the contactless smart card 100 comprises a two-dimensional tactile sensor adapted to locate the position of a finger engaging with the tactile sensor, as described above.

Figure 2:
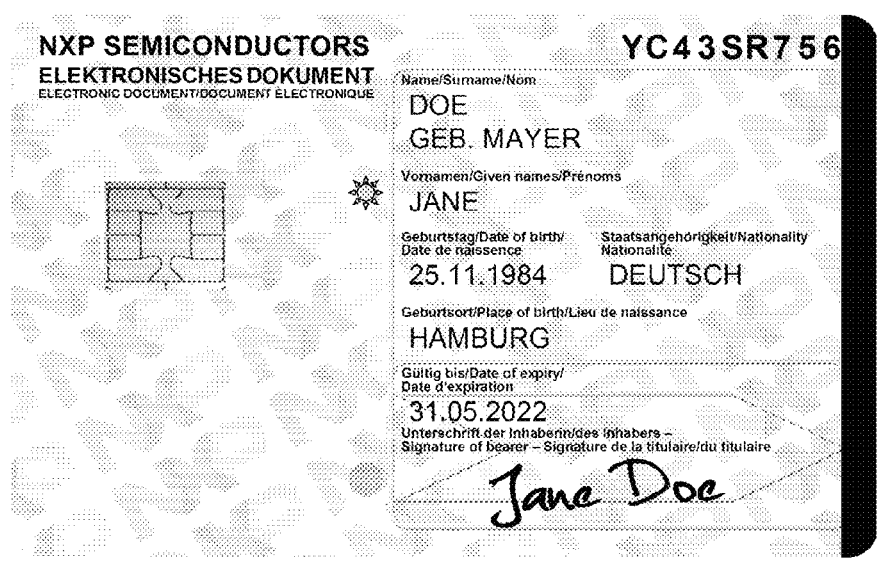
FIG. 2 illustrates an exemplary embodiment of a dual-interface smart card.

FIG. 2 illustrates an exemplary embodiment of a dual-interface smart card. In accordance with the present disclosure, the dual-interface smart card 200 comprises a two-dimensional tactile sensor adapted to locate the position of a finger engaging with the tactile sensor, as described above.

In case of security-relevant applications the stream of position data may be encrypted by the smart card before it is transmitted to the host system. A computer program or a secure element on the host system may decrypt the position data received from the smart card and translate them into input data requested by a host application running on a data processing device of the host system. Depending on the host application demand the position data may be translated into numbers, characters, special characters, special keys (space, arrow keys, backspace, return, shift, control, caps lock), mouse positions, mouse button commands, for example. The translated position data may be provided to the data processing device by the computer program through standard system APIs, such as keyboard drivers and mouse drivers. The "kernel32.dll" Windows API is a typical example of such an API.

Thus, the smart card may effectively substitute a conventional user input device such as a keyboard or a touch screen. The translation of position data into input data for the data processing device may require enrolment of a specific user. Reference templates generated during enrolment may be stored in a database of the host system.

As mentioned above, a smart card according to the present disclosure comprises a two-dimensional tactile sensor that is configured to locate the position of a finger engaging with the tactile sensor. The tactile sensor may use capacitive proximity sensing, pressure sensing, or any other technology or combinations thereof suited to provide the required position information. The sensor may involve a microprocessor unit comprising a firmware component configured to execute position capturing and generation of position data from tactile sensor signals.

Optionally, the smart card may have a secure element configured to encrypt the position data provided by the tactile sensor. Furthermore, the smart card may communicate the encrypted position data through communication channels as specified in standards such as ISO7816, ISO14443, NFC, involving required hardware means such as contact-based readers, contactless readers, and NFC interfaces, respectively. The optionally encrypted position data may be packed in application protocol data unit (APDU) containers for proper transfer.

A software component executable by the host system may be configured to receive the stream of position data provided by the smart card through a contact-based reader, contactless reader, or NFC interface, as the case may be. The contact-based reader, contactless reader or NFC interface may be connected to said host system or may form part of said host system. The software may make use of a software interface, such as the PCSC-interface or the JAVA smart card API. Furthermore, the software may interfere with the host system's API (for example a Windows API) in the sense that it may process the position data and may regenerates user input data from them, such as numbers, characters, special characters, special keys (space, arrow keys, backspace, return, shift, control, alt, caps lock), mouse positions, and mouse button commands.

Subsequently, the software may forward the regenerated (i.e. translated) position data to the related interfaces in the host system's API by suitable means, which are known per se. This may require a special keyboard driver and a special mouse driver that fit to the standard interfaces of the host system for a keyboard and a pointing device, i.e. a mouse. These drivers may derive information from the system API that may control whether position data is to be interpreted as keyboard data or mouse data. This may be required since the same position data could be used to generate keyboard data and mouse data. In case keyboard data is requested, the software may interpret certain position data patterns as character keys. Among the keys that may be recognized are: digit keys (0,1,2,3,4,5,6,7,8,9), character keys (A,B,C,D,E,F,G,H,I,J,K, L,M,N,O,P,Q,R,S,T,U,V,W,X,Y,Z), special character keys (+,−,*,/), special keys (Space, Shift, Shift-Lock, Control, Alt, Backspace, Enter, Function Keys), and menu control keys (Left, Right, Up, Down).

In case of correlated (similar) patterns the user may have a means to select between available interpretation options that may be implemented by a scrolling function that may scroll through the various options. This feature may apply to patterns such as (0,Q,O), (2,Z), (5,S), (1,I,J), and (U,V). In case of correlated patterns, selection between options may not be required if a context-sensitive interpretation can be applied that can identify the right character. In case mouse data are requested, the software interprets certain position data patterns as a left mouse button, a right mouse button, plain position data and a double-click. The information whether a left mouse-click or a right mouse-click has been entered may be derived from the application context. During a pointing session a simple lift-off and lift-down may represent a right mouse-click and a double lift-off and lift-down may represent a double-click. A left button-click and button-hold may be implemented by a toggle function where the first double touch means a left button-click and button-hold and a second double touch releases the button.

Figure 3:
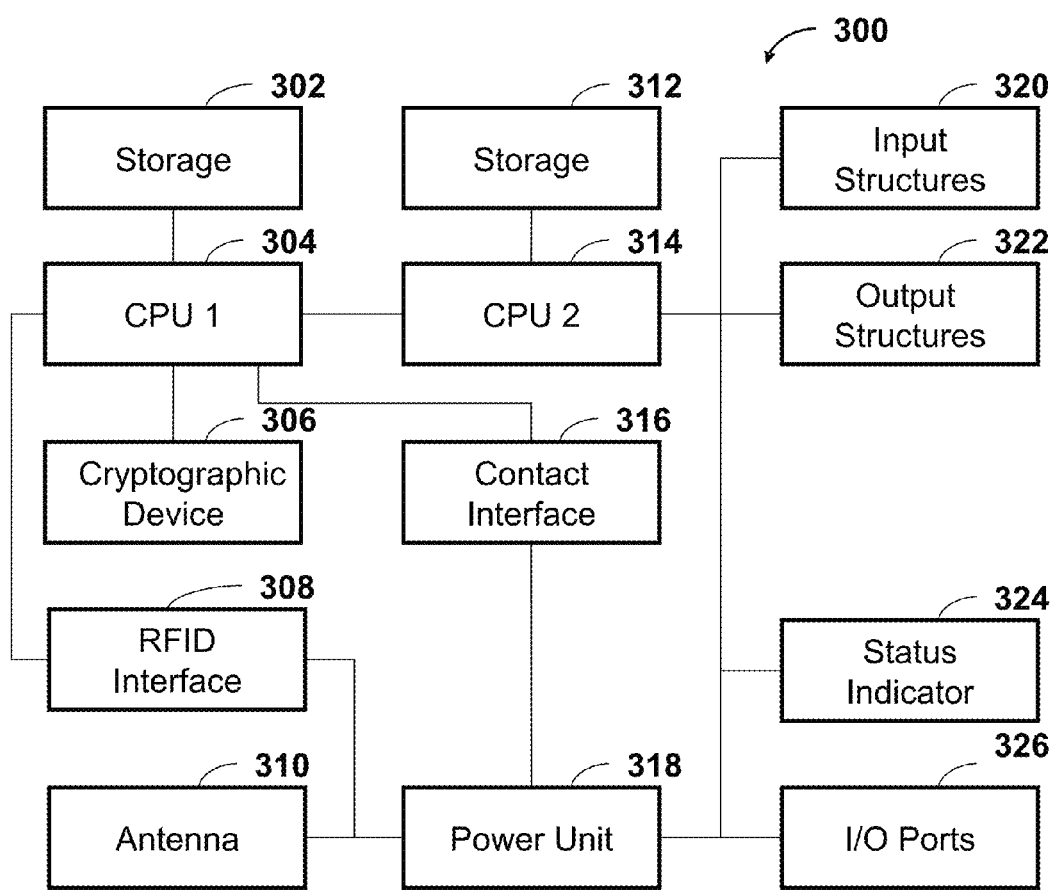
FIG. 3 illustrates a first example of a smart card system architecture.

FIG. 3 illustrates a first example of a smart card system architecture. In this example, the smart card 300 comprises storage units 302, 312, central processing units 304, 314, a cryptographic device 306, an RFID interface unit 308, an antenna 310, a contact-based interface 316, a power unit 318, input structures 320 and output structures 322, a status indicator 324 and input/output ports 326.

The smartcard 300 comprises a first CPU 304 and a second CPU 314 which may be configured by means of software for the required data processing. The power required by the smart card system may, in contactless operation, be obtained from a power unit 318 that rectifies the antenna signal from the antenna 310 and regulates it to the required voltage level. In contact mode the supply voltage provided by the contact interface 316 may be regulated by the power unit 318. In contactless mode the RFID interface unit 308 may demodulate the antenna signal in order to obtain the payload information from the host system. The RFID interface unit 308 may also modulate the payload information generated by the smart card system and may provide the modulated signal through the antenna 310 to the host system. In contact mode information exchange between the host system and the first CPU 304 may be implemented through an ISO7816 interface represented by the contact interface 316. The second CPU 314 may process tactile information provided by the input structures 320, may forward information to output structures 322 or to the status indicator 324 for user feedback, or it may change the electrical status of general input/output (GPIOs) devices. Firmware and data required to define the function of the first CPU 304 may be stored in a storage unit 302 attached to that CPU 304. Likewise, firmware and data required to define the function of the second CPU 314 may be stored in a storage unit 312 attached to that CPU 314.

Figure 4:
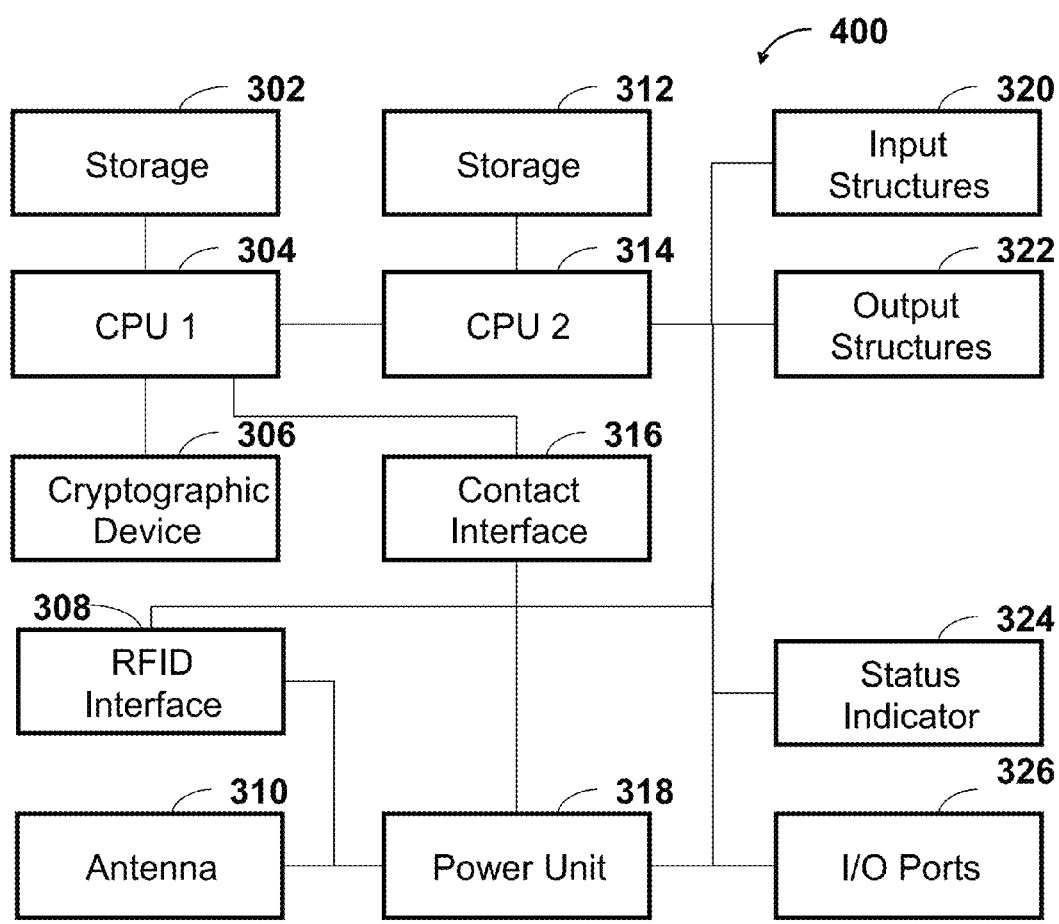
FIG. 4 illustrates a second example of a smart card system architecture.

FIG. 4 illustrates a second example of a smart card system architecture. In this example, the RFID interface unit 308 is connected to the second CPU 314 instead of to the first CPU 304. In this implementation the second CPU 314 performs a part of the ISO14443 decoding.

Figure 5:
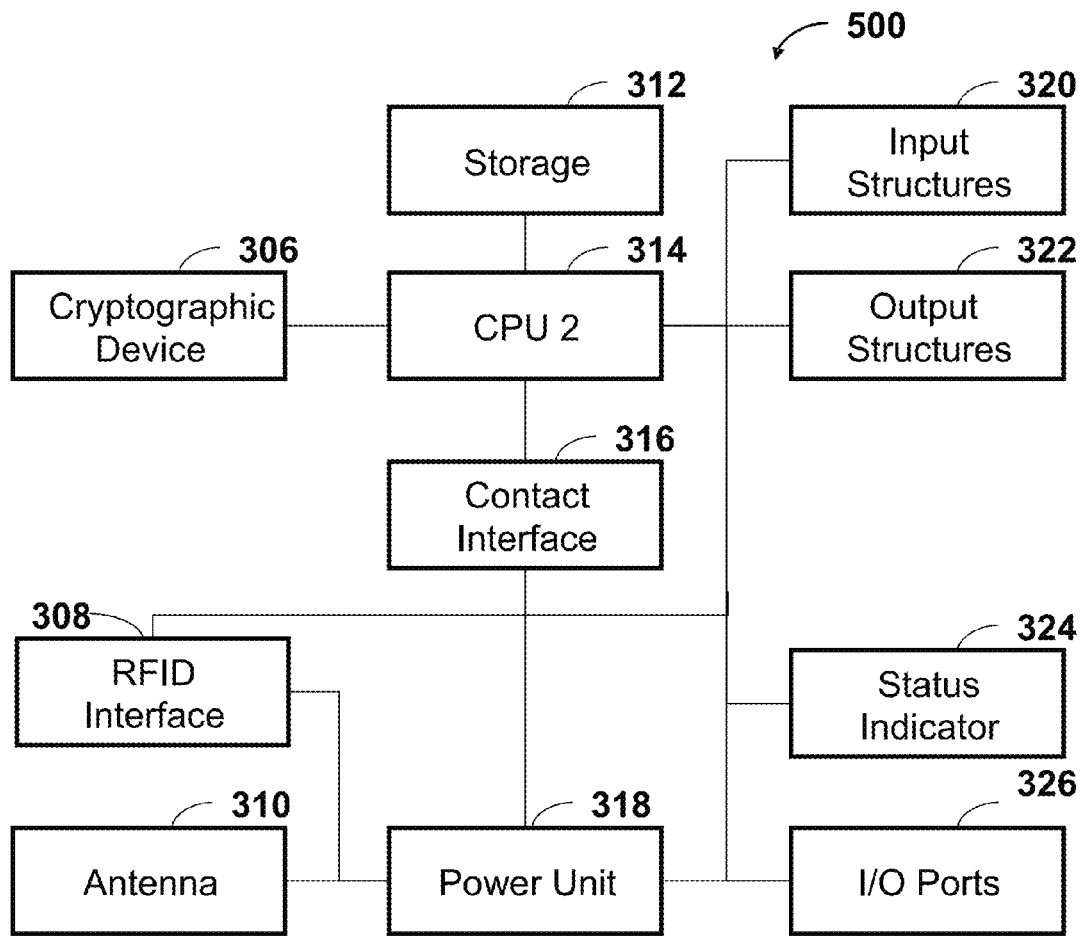
FIG. 5 illustrates a third example of a smart card system architecture.

FIG. 5 illustrates a third example of a smart card system architecture. In this example, the function of the first CPU 304 is taken over by the second CPU 314 and the RFID interface unit 308 is connected to the second CPU 314 in accordance therewith. In this implementation the second CPU 314 may perform a part of the ISO14443 decoding.

Figure 6:
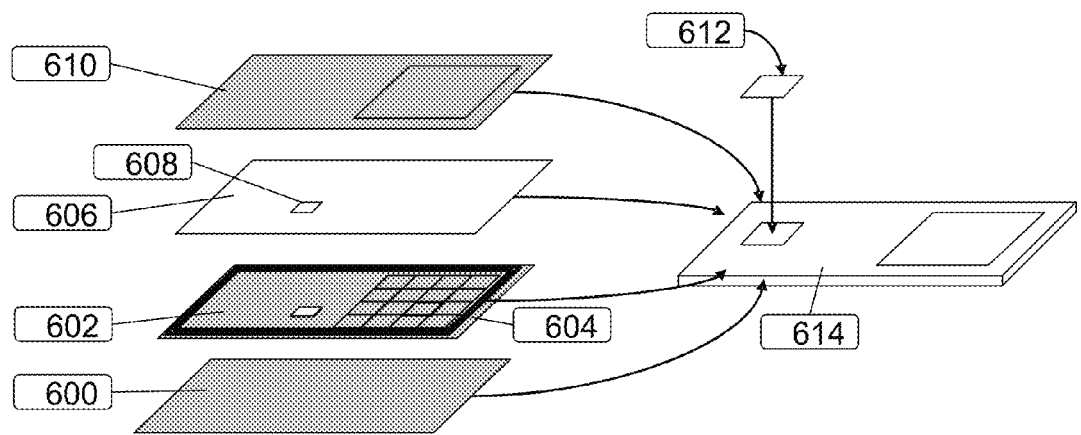
FIG. 6 illustrates how a smart card is fabricated from several components.

FIG. 6 illustrates how a smart card is fabricated from several components. In particular, a smart card of the kind set forth may be composed of bottom foil 600, a system inlay 602, a tactile interface 604, a compensation layer 606 having a cut-out 608, top foil 610, and a contact interface module 612. The assembled smart card 614 is shown on the right-hand side of FIG. 6.

In order to minimize costs, the smart card system may be assembled on a single substrate or system inlay 602 which is made from the same material as the embedding card. After lamination it may form together with the other card layers a solid block of material. Chip components may be assembled using direct chip attach, thus avoiding costly chip packages. Passive components may either be soldered by low-temperature solder or may be glued using ICP silicon paste. A compensation layer 606 with a cut-out 608 at chip and component positions may be put on top of the substrate 602. A top layer 610 and a bottom layer 600 may complete the card construction. The card layers may either be directly laminated or thin glue layers may be used to link the various card layers.

In case of lamination without glue layers the substrate material may be identical to the embedding material except the softening temperature, which may have a higher softening temperature than that of the embedding material. As a consequence, the PCB structures on the substrate may be maintained during lamination. Polyurethane foil (TPU) may be used as glue layer. After card lamination an opening may be milled into the card's surface that may reach down to the substrate's connection layer. A contact module may be assembled into the milled cut-out either by ACA glue, ACF, NCA glue, NCF, by soldering or other means with the objective to fix the contact module. The contact module may be configured to provide contact between the contact modules surface and the smart card substrate in order to connect the contact interface to the related smart card components.

Figure 7:
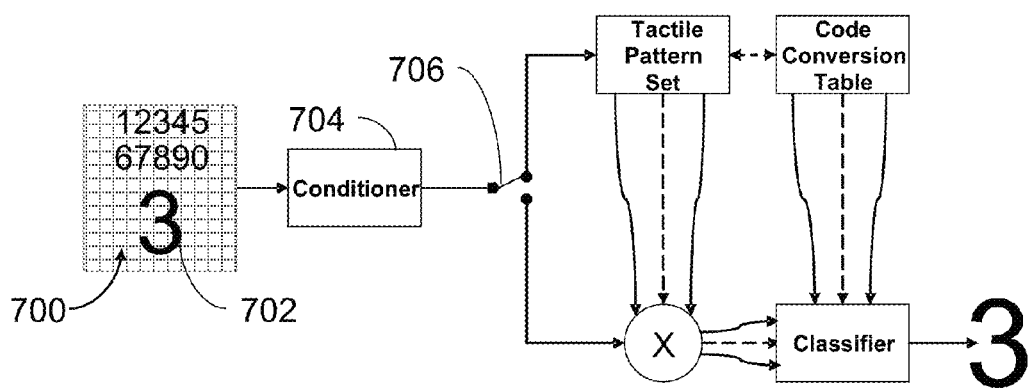
FIG. 7 illustrates the enrolment of tactile reference patterns in a smart card.
Figure 8:
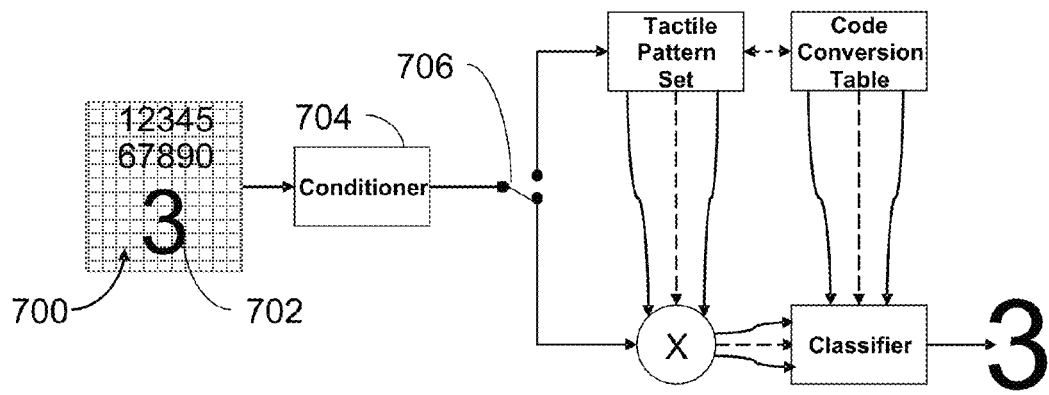
FIG. 8 illustrates the recognition of tactile reference patterns in a smart card.

FIG. 7 illustrates the enrolment of tactile reference patterns in a smart card. FIG. 8 illustrates the recognition of tactile reference patterns in a smart card. During authentication of a user the smart card may utilize data entry in handwritten format, for example as described in the European patent application titled "Security Token and Authentication System", application number EP12155351.5, filed on 14 Feb. 2012 by applicant NXP B.V., which is incorporated herein by reference. The decoding of handwritten user input data may be implemented on the host system and may be based on a tactile pattern recognition that comprises a tactile sensor interface 700 configured to capture tactile patterns 702, a tactile pattern conditioner 704 configured to make the tactile patterns machine-readable and a mode selector 706 that switches between a reference pattern capturing or enrolment mode (as shown in FIG. 7) and a recognition mode (as shown in FIG. 8). In the reference pattern capturing or enrolment mode the smart card is effectively in a "training mode" in which it is prepared for actual use.

In said enrolment mode a collection of tactile reference patterns representing a code alphabet may be stored in machine-readable format in a database on the host system. An additional code conversion table may be used to increase the code entropy. In said recognition mode entered tactile patterns may be converted into machine-readable format and then correlated against characters of the trained code alphabet stored in machine-readable format in a database on the host system. A classifier based on a correlator may determine the code alphabet member that has been entered. Multiple character entries may form a personal identification number (PIN) code. Furthermore, in accordance with the present disclosure, a pointing device mode or "mouse mode" may be defined. For example, in said pointing device mode the tactile data obtained from the tactile sensor may be converted in machine-readable position data that may be sent via the selected communication interface to the host system for further processing.

In case of increased security requirements the tactile pattern recognition process may also be implemented directly on the smart card. In this case the tactile reference patterns may be stored in the secure environment of a secure element on the smart card. Also, recognized user keypad input may be transferred to the host application for further processing. Mouse input will directly be transferred to the host system for further processing.

In another exemplary embodiment, only the reference patterns required for PIN-code authentication may be stored on the smart card and only the pattern recognition required for user authentication may be executed on the smart card. In this case, transfer of position data from the smart card to the host may be enabled by successful authentication and all subsequent position data may be sent for recognition or processing to the host application. This implementation may offer a good compromise between security requirements and flexibility.

Figure 9:
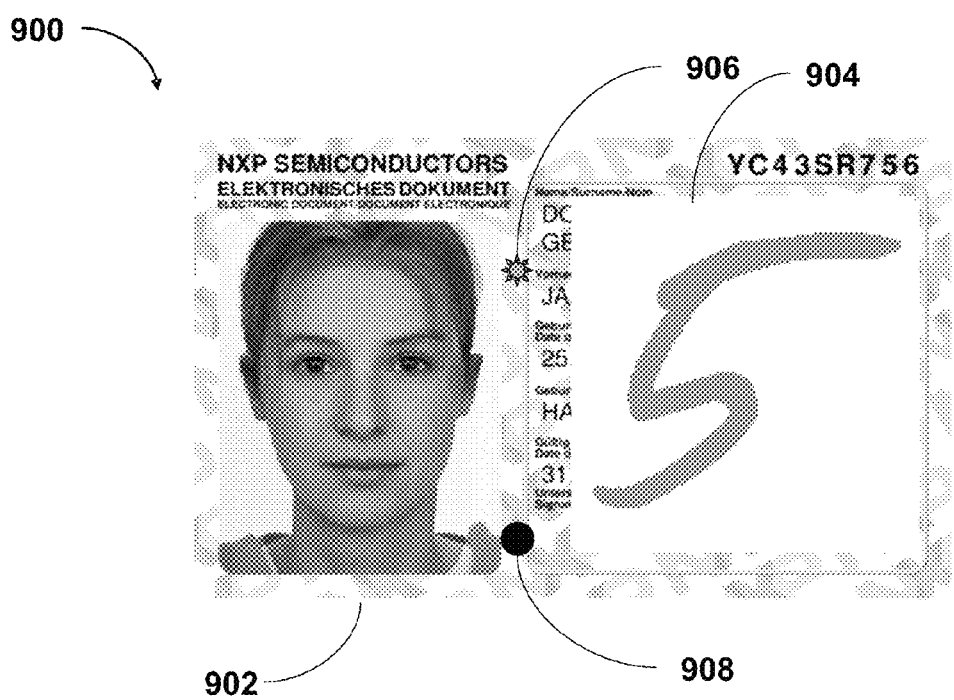
FIG. 9 illustrates various elements of a smart card.

FIG. 9 illustrates various elements of a smart card. In accordance with the present disclosure, a system 900 on, for example, a dual-interface smart card 902 may comprise the following elements: a tactile interface 904, an optical feedback indicator 906 and an additional feedback unit 908. It is noted that, besides providing a user interface for a data processing device in accordance with the present disclosure, the smart card may provide an on-card multi-factor authentication function as well as a payment application.

A smart card of the kind set forth may be used in a variety of application areas. For example, the smart card may be used to provide a personalized and secure user input interface for industrial process control, to provide a simple user interface for public web access, and to provide payment or access control functions including multi-factor authentication. Furthermore, the smart card may combine the function of a company card with a user specific control function. This may be required by hospitals where safety relevant devices must only be controlled by authorized staff. Furthermore, the smart card may enable new services based on control functions that require access rights or pay-per-use rights. In case of pay-per-use, payment may also be handled by a concurrent smart card application. In addition, the smart card may enable user specific control functions in applications where neither touch screens nor keyboards are allowed, as well as user specific control functions in applications where a user specific control interface may be required. Furthermore, the smart card may enable control functions that for cost reasons do not allow touch screens or special keyboards. Furthermore, the smart card may enable control functions that require logging of the control events. Furthermore, the smart card may be used to provide a simple control interface in private applications where simple authentication combined with control is required, for example when opening a garage door.

Figure 10:
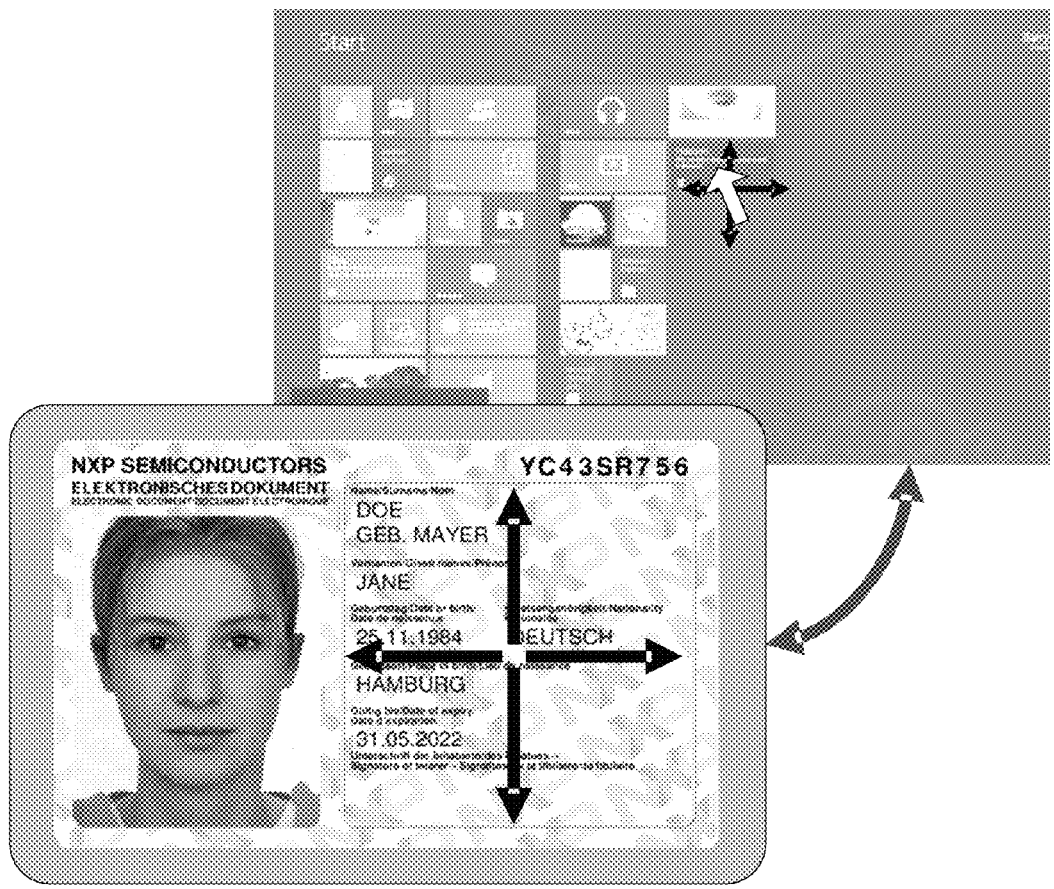
FIG. 10 illustrates controlling a desktop application by means of a smart card.

FIG. 10 illustrates controlling a desktop application by means of a smart card. In this example, a cursor is navigated on a Windows 8 desktop. A long touch on an application box may start the selected application. A smart card of the kind set forth controls the movement of the cursor on the desktop.

Figure 11:
FIG. 11 illustrates filling a web-form by means of a smart card.

FIG. 11 illustrates filling a web-form by means of a smart card. In this example, the web-form is filled using online handwriting recognition, enabled by a smart card of the kind set forth.

Figure 12:
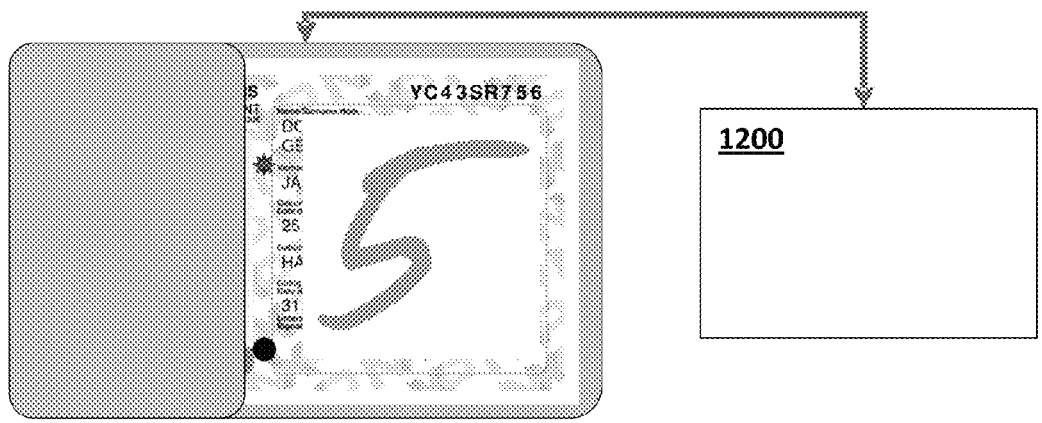
FIG. 12 illustrates authenticating towards a manufacturing process by means of a smart card.
Figure 13:
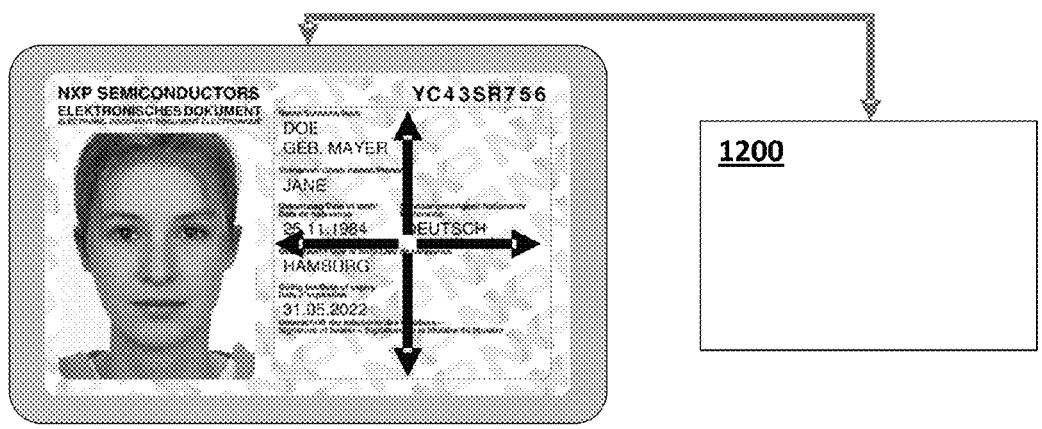
FIG. 13 illustrates controlling a manufacturing process by means of a smart card.

FIG. 12 illustrates authenticating towards a manufacturing process by means of a smart card. More specifically, a smart card of the kind set forth is used for authenticating a user towards a manufacturing process control interface 1200. FIG. 13 illustrates controlling a manufacturing process by means of a smart card. More specifically, a smart card of the kind set forth is used for providing control data to a manufacturing process control interface 1200.

In a more specific application, the data processing device is a manufacturing process control interface 1200. A contact-based reader may be connected to the manufacturing process control interface 1200. An authentication application running on the manufacturing process control interface 1200 may request the user to enter his access information (for example a PIN). Upon successful entry and verification of the access information, control over the manufacturing process control interface may be enabled such that keyboard and/or mouse information can be provided to the manufacturing process control interface 1200.

The smart card may also be connected to the manufacturing process control interface 1200 through a contactless reader. As long as the user provides input to the tactile sensor embedded in the smart card, position data may be sent to the manufacturing process control interface 1200, and the manufacturing process control interface 1200 may translate said position data into control data in the form of keyboard or mouse data for controlling the manufacturing process. As soon as the user removes the smart card from the contactless reader, the control session can be terminated and the user can be logged off. In addition, there may be a need to read out a log of executed control operations. In such cases it may be feasible to provide the logged control information through available external displays, such as the display of an NFC-enabled mobile device or a PC/Laptop connected through a contact-based or contactless interface.

Finally, it is noted that the drawings are schematic. In different drawings, similar or identical elements are provided with the same reference signs. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS

100 contactless smart card
200 dual-interface smart card
300 smart card architecture
302 storage unit
304 central processing unit
306 cryptographic device
308 RFID interface
310 antenna
312 storage unit
314 central processing unit
316 contact interface
318 power unit
320 input structures
322 output structures
324 status indicator
326 input/output ports
400 smart card architecture
500 smart card architecture
600 bottom foil
602 system inlay
604 tactile interface
606 compensation layer
608 cut-out
610 top foil
612 contact interface module
614 assembled smart card
700 tactile sensor interface
702 tactile patterns
704 tactile pattern conditioner
706 mode selector
900 system on smart card
902 dual-interface smart card
904 tactile interface 906 optical feedback indicator
908 additional feedback unit
1200 manufacturing process control interface

The invention claimed is:

1. A security token, in particular a smart card, comprising a two-dimensional tactile sensing user interface and an NFC interface, wherein said two-dimensional tactile sensing user interface is adapted to capture a stream of two-dimensional position data corresponding to a sequence of positions of a finger engaging with said two-dimensional tactile sensing user interface and representing a stream of input data for a host application running on a data processing device of a host system, said security token being adapted to transmit said stream of two-dimensional position data to said host system via said NFC interface for further processing.

2. A security token as claimed in claim 1, further being adapted to encrypt the stream of two-dimensional position data before transmitting said stream of position data to the host system.

3. A security token as claimed in claim 1, further being adapted to format the stream of two-dimensional position data as application protocol data units before transmitting said stream of position data to the host system.

4. A security token as claimed in claim 1, further being adapted to provide a single-factor or multi-factor user authentication function.

5. A data processing system comprising the security token as claimed in claim 1 and the host system, wherein the host system comprises a data processing device, and wherein the host system is adapted to receive the stream of two-dimensional position data via the NFC interface and to convert said stream of two-dimensional position data into the stream of input data for said data processing device.

6. A data processing system as claimed in claim 5, wherein the host system comprises a computer program or a secure element for converting said stream of two-dimensional position data into the stream of input data for said data processing device.

7. A data processing system as claimed in claim 5, wherein the input data comprise alphanumeric symbols.

8. A data processing system as claimed in claim 5, wherein the input data comprise data representing a movement of a pointing device and/or data representing a selection operation performable on a pointing device.

9. A data processing system as claimed in claim 5, wherein the input data comprise special keys as defined on a keyboard and/or special character keys as defined on a keyboard.

10. A data processing system as claimed in claim 5, wherein the data processing device is one of the group of: a personal computer, a portable computer, a web tablet, a terminal, a mobile device, a vehicle, an industrial process control device.

11. A method of processing data, wherein a two-dimensional tactile sensing user interface comprised in a security token, in particular in a smart card, captures a stream of two-dimensional position data corresponding to a sequence of positions of a finger engaging with said two-dimensional tactile sensing user interface and representing a stream of input data for a host application running on a data processing device of a host system, and wherein the security token transmits said stream of position data to the host system via an NFC interface for further processing.

12. The method of claim 11, wherein the input data comprise data representing a movement of a pointing device and/or data representing a selection operation performable on a pointing device.

* * * * *